US00RE34084E

United States Patent [19]

Noschese

[11] E Patent Number: Re. 34,084

[45] Reissued Date of Patent: Sep. 29, 1992

[54] VERTICAL ACTION CONTACT SPRING

[75] Inventor: Rocco J. Noschese, Wilton, Conn.

[73] Assignee: Burndy Corporation, Norwalk, Conn.

[21] Appl. No.: 705,488

[22] Filed: May 24, 1991

Related U.S. Patent Documents

Reissue of:

[64] Patent No.: 4,961,709
Issued: Oct. 9, 1990
Appl. No.: 310,325
Filed: Feb. 13, 1989

[51] Int. Cl.[5] ..... H01R 9/09

[52] U.S. Cl. ..... 439/66; 439/82; 439/245

[58] Field of Search ..... 439/66, 75, 82, 245, 439/591, 840, 775, 816, 825, 81, 91

[56] References Cited

U.S. PATENT DOCUMENTS

| | | | |
|---|---|---|---|
| 3,258,736 | 6/1966 | Crawford et al. | 339/252 |
| 4,161,346 | 7/1979 | Cherian et al. | 339/17 M |
| 4,505,529 | 3/1985 | Barkus | 339/17 M |
| 4,752,231 | 6/1988 | Olsson | 439/66 |
| 4,778,404 | 10/1988 | Pass | 439/387 |

*Primary Examiner*—Joseph H. McGlynn
*Attorney, Agent, or Firm*—Perman & Green

[57] ABSTRACT

An electrical connector for establishing electrical connection between spaced printed circuit boards, for example, comprising a spiral-wound elongated spring member formed of a one-piece blank and being longitudinally resilient for establishing firm surface contact between circuit boards and radially resilient to provide firm contact in a surrounding receptable when either end of the connector is compressed. A signal connector is fitted into a carrier block and surrounded by ground connectors to protect the signal from interference. The connector design is small in overall length to minimize connector-length related disturbances to the signal.

15 Claims, 1 Drawing Sheet

VERTICAL ACTION CONTACT SPRING

Matter enclosed in heavy brackets [ ] appears in the original patent but forms no part of this reissue specification; matter printed in italics indicates the additions made by reissue.

BACKGROUND OF THE INVENTION

The present invention is directed to electrical contact springs, particularly to those used for establishing and maintaining electrical connections between circuit boards.

When transmitting signals from board to board in an electrical circuit, it is essential that the integrity of the signals be protected or shielded from interfering with each other through noise, etc. Additionally, the length of the signal circuit must be relatively short to avoid disturbances of signal integrity related to length of connector.

Prior art patents directed to electrical connectors include U.S. Pat. Nos. 4,161,346, 4,505,529 and 4,752,231.

U.S. Pat. No. 4,161,346 is directed to an electrical connector for interconnecting electrical circuits on two electronic circuit boards involving surface to surface contact between generally parallel surfaces. The patent discloses a connector element having a symmetrical, sinuous shape including a spring section for exerting a determined contact force and establishing the electrical connection. In addition, the connecting element is provided with a separate shorting beam into connector opposed ends and the connecting element to provide a shorter electrical path and to act as a spring for retaining the contact element within its housing.

U.S. Pat. No. 4,505,529 relates to a connector for electrically interconnecting printed circuit boards in the form with three elongated beams extending between contact surfaces with the configuration of the contact element being such that it buckles under compression forces to provide spring forces.

U.S. Pat. No. 4,752,231 is directed to an electrical connector including a rigid insulating housing bolted between parallel circuit boards and having electrical connectors located within and positioned by the rigid housing for establishing electrical contact between the circuit boards. The connectors themselves are in the form of semi-elliptic springs having outwardly projecting tips for establishing contact with opposing portions of the circuit board.

U.S. Pat. No. 4,778,404 is of interest and is directed to a spring terminal having an intermediate spring portion form of spring sections joined at their adjacent ends to form a zig zag configuration. The terminal is held in a fixed position and is generally adapted for use in difficult environmental situations where mating connector members must be fully sealed.

A commercially available electrical connector includes telescoping, longitudinally connected spring loaded elements in the form of "pogo stick" for providing spring-biased connectors.

Each of the foregoing devices involves complex connector constructions including multiple components in several cases and complicated assembly techniques. Additionally, the block members used for holding and positioning the connectors also have intricate designs to accommodate assembly and functioning of the connectors. The complexities of design, assembly, and operation of these connectors are drawbacks in electronic circuit board devices having a multitude of connections and where available space is limited and are counterproductive as they increase opportunities for loss of signal integrity.

SUMMARY OF THE INVENTION

The present invention is directed to an electrical contact spring used for interconnecting parallel circuit boards in which the spring is received and positioned in a metal block between the circuit boards. The spring connector consists of a single metallic element wound in the form of a spiral about its longitudinal axis and providing for electrical contract at its opposite ends positioned between parallel circuit boards and having longitudinal resiliency to establish firm spring electrical contact between the circuit boards. Additionally, the contact spring tend to expand radially when compressed to promote firm engagement between the spring itself and the cylindrical walls of matrix or holding block used for receiving and positioning a multitude of contact springs.

The contact spring according to the present invention has the following advantages over the prior art. The spring is fabricated from a single blank by rolling the blank into a spiral and coining the tips to provide surface contact between opposed circuit board pads. For assembly, the connectors are inserted into cylindrical bores or holes in a holding block and are retained within the bores as the springs expand radially. The spring members are resilient and return to the original position after compression forces are released and they are not permanently deformed.

A metal block containing electrical contact springs of the present invention is placed between parallel circuit boards and provides a means of transmitting shielded signals from board to board. For transmitting signals, a contact spring is placed in an insulating sleeve and located in a hole or bore in the metal block. The insulated signal spring is surrounded by shielding or grounding circuits in order to protect the signals through the metal block interface from interfering with one another with noise and so forth. The shielding or grounding circuits are insulated contact springs fitted in holes through the metal block located around the signal carrying connectors and serve to protect signals from interference.

A contact spring according to the invention provides a signal circuit of relatively short length through the connector block. The short length of the signal circuit reduces the opportunity for disturbing signal integrity.

OBJECTS OF THE INVENTION

It is an object of the invention to provide a one piece electrical contact spring which is formed by rolling a one piece blank spiral form to provide a longitudinally and laterally resilient contact spring.

Another object of the present invention is to provide an electrical contact element in the form of a spiral spring which yields longitudinally to provide spring contact between opposed circuit boards and yields radially to provide firm contact positioning the spring within its carrier member.

A further object of the invention is to provide an arrangement for transmitting shielded signals between circuit boards through a signal circuit connector of short length minimizing the opportunities for disturbing signal integrity.

Another further objects of the invention will occur to those skilled in the art with an understanding of the detailed description of the invention or upon employment of the invention in practice.

DESCRIPTION OF THE DRAWING

A preferred embodiment has been chosen for illustrating and describing the invention and is shown in the accompanying drawing in which.

DETAILED DESCRIPTION OF THE PREFERRED EMBODIMENT

Figure 1:
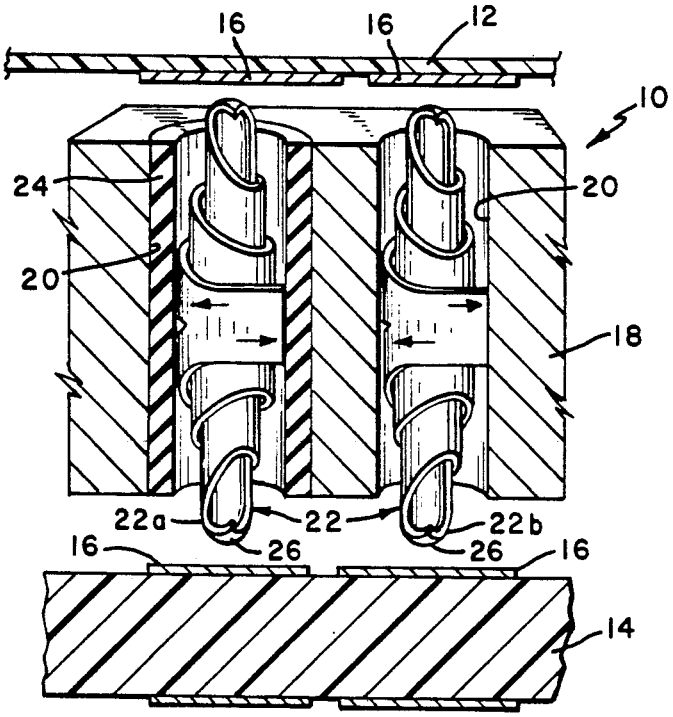
FIG. 1 is side elevational view partly in section showing the spring action electrical connectors held in position in a connector retaining block between circuit boards.

The present invention is used with electronic components such as circuit boards in which a multitude of electrical connections must be established between components. As shown in FIG. 1, a sub-assembly of an electrical device 10 including [an] *a* PC board 12 and a back plane 14 are generally parallel and are fitted with pads 16 for establishing electrical connection therebetween. A retaining block 18 is a conductive metal and has a multitude of holes 20 therein for receiving connectors 22 according to the invention. In one case, a signal connector 22a is placed within an insulating plastic or other dielectric sleeve 24 for insertion into the retaining block. In another case a ground connector 22b is placed within the retaining block bore as a ground connection between PCB pads, retaining block, and back plane.

In order to protect transmitted signals from interference, each signal connector 22a is surrounded by ground connectors 22b such that signal connectors are spaced from each other in length and width of the retaining block by means of a ground connector. The surrounding ground connectors and the metal retaining block provide such signal integrity protection.

A connector 22 according to the present invention, comprises a spiral wound longitudinally compressible spring connector for establishing electrical contact between spaced electronic board members. The spaced boards have a number of corresponding electrical surfaces or pads 16 which require contact by a multitude of connectors. The connector 22 is a one-piece spiral-would coil of conductive material having longitudinally spaced contact tips 26 for establishing contact with PCB and back plane pads 16. Additionally, opposite tips flex independently of each other. It will be observed that each end or tip 26 of the connector is rolled or coined in the form of a dome (FIG. 3) 28 to provide a contact surface for purposes of establishing an electrical connection. In another aspect of the invention, the connector expands radially of its longitudinal axis as it is compressed more firmly to secure the connector within its receiving bore of the metal block. This has an advantage in that it is not necessary to press the spring uniformly from both ends. Indeed, the spring connector may be compressed from one end and will expand radially into firm and immovable contact with its receptacle. This has the advantage of allowing flexibility in assembling circuit board members from either end of the spring connector in whatever sequence is desired.

Figure 2:
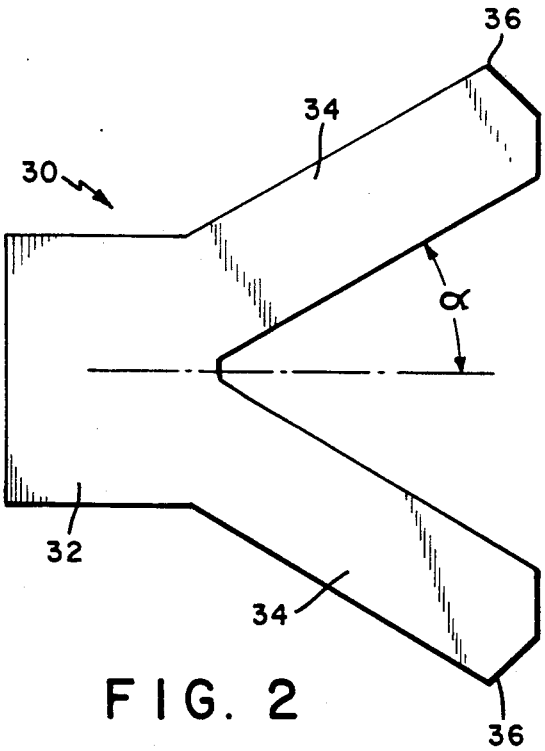
FIG. 2 is a plan view of a blank used in forming a spring connector according to the present invention.

FIG. 2 illustrates a developed blank 30 from which the spring connector is fabricated. The blank is generally Y-shaped including a rectangular base portion 32 and a pair of outwardly divergent arms 34 projecting from one side of the base. Any suitable angle of divergence $\alpha$ may be selected and in the embodiment shown in FIG. 2 the angle is 30°. The outer ends of each arm are trimmed to form tips 36 which become the outer extremities of the connector in rolled form. Preferably the blank is formed of a suitable conductive metal such as berylium [cooper] *copper* of high tensile strength and a thickness of approximately 3 to 4 mils. The berylium [cooper] *copper* blank may be plated with an outer gold layer over a nickel base. The spring is formed by rolling into a tight spiral having at least 3 complete coils when placed in a 30 mil diameter [gage] *gauge*.

Figure 3:
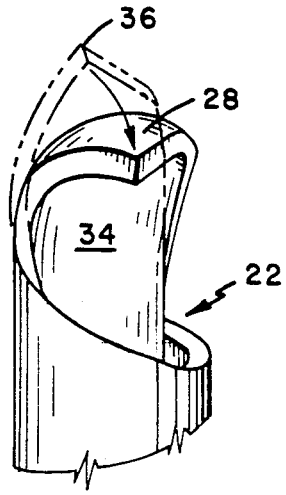
FIG. 3 is a detailed perspective view of an end or tip of a connector according to the [presenting] *present* invention showing the formation of a contact surface.

As shown in FIG. 3, the tip 36 at each end of the spring is coined over forming a dome-shaped contact area 28 to assure an electrical connection based on the surface of the spring and not a tip or edge.

Figure 4:
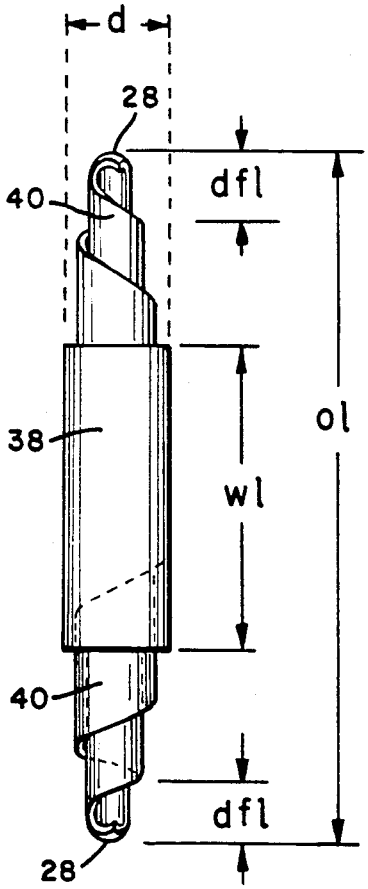
FIG. 4 illustrates the spring connector in a free state.

FIG. 4 illustrates the spring connector in free form including a central or waist section 38 and longitudinally projecting spring action arms 40. Each of the tips deflects independently of the other a distance of approximately 10 percent of the overall length between tips of the connector with no set. Additionally, the spring connector is capable of a reduction in waist diameter d to approximately 0.8d to accommodate insertion in a bore 20 or sleeve 24 of the retaining block while maintaining spring action of each of the contact arms. A specific form of contact spring has the following approximate dimensions in inches: overall length (ol) 0.208; waist length (wl) 0.090; waist diameter free state (d) 0.036; waist diameter in service 0.030; and contact arm deflection (dfl) of 0.020 under a force of 50–100 grams without set. *As can be seen from FIG. 4, when the spring is rolled into a spiral, the upper and lower arms 40 of the Y-shape extend away from the central section 38 with two opposite twists. The upper arm has a left hand twist and the lower arm has a right hand twist.*

A significant advantage of the invention is the relatively short length of the signal circuit through the connector block made possible by the short overall length of the connector reducing the opportunity for disturbing signal integrity through factors related to length of signal connector circuit.

It will be understood from the above description that the contact spring is formed using conventional materials and provides a connector of considerable advantage when compared to springs of the prior art.

I claim:

1. An electrical connector for positioning within an opening in a carrier block member between spaced electric circuit surfaces comprising a one-piece blank in the form of a base with projecting divergent arm members rolled into a spiral of at least three complete coils when radially compressed, having longitudinally spaced contact surfaces formed of the ends of the arm members, being longitudinally resilient to establish electric contact between its contact surface and the circuit surfaces, and being radially resilient to establish firm engagement between the rolled base portion of the spring and the carrier opening when the spring is longitudinally compressed.

2. An electrical connector according to claim 1 in which each contact surface of the connector may be deflected without set a distance of up to 10 percent of the length between contact surfaces of the connector.

3. An electrical connector according to claim 1 in which the spiral connector may be radially compressed up to 20 percent of the free state rolled base diameter of the connector without restricting the longitudinal resiliency of the arm members.

4. An electrical connector according to claim 1 in which the tips of the rolled arm members are coined to form dome-shaped contact surfaces.

5. A connector adapted to be held and positioned in a cylindrical opening in a block member for the purpose of establishing electrical contact between spaced generally parallel electrical circuit surface components comprising a one-piece member originally in the form of a sheet blank having a base portion with divergent arm members projecting from one side of the base and being rolled into a spiral of at least three complete coils when compressed with the arm members being inside and the base portion being to the outside of the rolled connector, the connector having longitudinally spaced contact surfaces defined by the outer extremities of the arm members, being longitudinally resilient under force to establish electric contact between the spaced circuit surfaces, and being radially resilient to establish firm engagement between the rolled base portion of the connector and the cylindrical opening when the connector is compressed radially and inserted into opening and when the connector is compressed from either or both of its contact surfaces.

6. A connector as defined in claim 5 in which each of the contact surfaces may be deflected without set a distance of approximately 10 percent of the longitudinal dimension of the connector in free state, the free state diameter of the base portion of the connector may be reduced up to 20 percent without retarding longitudinal deflection of the contact surfaces, and in which the contact surfaces are coined to a dome-shape.

7. A connector as defined in claim 6 of berylium copper plated with nickel and the nickel plated with gold.

8. A connector as defined in claim 5 having a short overall length to minimize signal disturbances related to length of connector.

9. A carrier block for positioning connectors between spaced electric circuit surfaces comprising a plurality of holes in the carrier block member with a signal connector located in one hole surrounded by ground connectors for preserving the integrity of signals, each connector being a one-piece blank in the form of a base with projecting divergent arm members rolled into a spiral having longitudinally spaced contact surfaces formed of the ends of the arm members, being longitudinally resilient to establish electric contact between its contact surface and the circuit surfaces, being radially resilient to establish firm engagement between the rolled base portion of the spring and the carrier opening when the spring is compressed from either of its tips, each signal connector carried by an insulating sleeve in the carrier block, and each ground connector being grounded to the carrier block.

*10. An electrical connector comprising:*

*a matrix block having holes therein; and*

*spring contacts connected to the matrix block and at least partially located in the holes, the contacts having ends extending out of the holes from opposite sides of the matrix block, each contact being comprised of a one-piece member rolled into a column shape and adapted to radially frictionally hold the contact in a hole of the matrix block and adapted to be longitudinally deflectable between two members such that the contacts can contact the two members at various different distances therebetween.*

*11. An electrical connector comprising:*

*a block having holes therein;*

*spring contacts connected to the block, each contact being comprised of a one-piece member rolled into a column shape with a center section frictionally held in one of the holes of the block and two ends extending from the hole, each end being independently deflectable relative to the other end; and*

*at least one insulating sleeve located between one of the contacts and the block.*

*12. A spring contact comprising:*

*a first section having a contact tip and a generally coiled shape, the first section being coiled in a first type of twist; and*

*a second section having a contact tip and a general coiled shape, the second section being coiled in a second type of twist and being electrically connected to the first section.*

*13. A spring contact as in claim 12 wherein the spring contact is comprised of a single member.*

*14. A spring contact as in claim 12 wherein the first type of twist is opposite to the second type of twist.*

*15. A spring contact as in claim 12 further comprising a middle section between the first and second sections for mounting the spring contact to a housing.*

* * * * *